(12) United States Patent
MacKay et al.

(10) Patent No.: US 8,397,070 B2
(45) Date of Patent: *Mar. 12, 2013

(54) SYSTEMS AND METHODS FOR GOVERNING CONTENT RENDERING, PROTECTION, AND MANAGEMENT APPLICATIONS

(75) Inventors: Michael K. MacKay, Los Altos, CA (US); David P. Maher, Livermore, CA (US)

(73) Assignee: Intertrust Technologies Corp., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/232,903

(22) Filed: Sep. 14, 2011

(65) Prior Publication Data

US 2012/0005764 A1    Jan. 5, 2012

Related U.S. Application Data

(63) Continuation of application No. 11/509,867, filed on Aug. 25, 2006, now abandoned, which is a continuation of application No. 09/874,744, filed on Jun. 4, 2001, now Pat. No. 7,107,448.

(60) Provisional application No. 60/209,454, filed on Jun. 4, 2000.

(51) Int. Cl.
*H04L 9/00*    (2006.01)

(52) U.S. Cl. .......................................... 713/171; 726/26

(58) Field of Classification Search .................. 713/165, 713/171; 726/26–30
See application file for complete search history.

(56) References Cited

U.S. PATENT DOCUMENTS

| 4,827,508 | A | 5/1989 | Shear |
| 4,977,594 | A | 12/1990 | Shear |
| 5,050,213 | A | 9/1991 | Shear |
| 5,410,598 | A | 4/1995 | Shear |
| 5,530,235 | A | 6/1996 | Stefik et al. |
| 5,534,975 | A | 7/1996 | Stefik et al. |
| 5,629,980 | A | 5/1997 | Stefik et al. |
| 5,634,012 | A | 5/1997 | Stefik et al. |
| 5,638,443 | A | 6/1997 | Stefik et al. |
| 5,715,403 | A | 2/1998 | Stefik |
| 5,892,900 | A | 4/1999 | Ginter et al. |
| 5,892,904 | A | 4/1999 | Atkinson et al. |
| 5,910,987 | A | 6/1999 | Ginter et al. |
| 5,915,019 | A | 6/1999 | Ginter et al. |
| 5,917,912 | A | 6/1999 | Ginter et al. |
| 5,920,861 | A | 7/1999 | Hall et al. |
| 5,940,504 | A | 8/1999 | Griswold |
| 5,943,422 | A | 8/1999 | Van Wie et al. |

(Continued)

FOREIGN PATENT DOCUMENTS

| EP | 0 715 247 A1 | 6/1996 |
| WO | WO 96/27155 | 9/1996 |

(Continued)

OTHER PUBLICATIONS

Menezes, A.J. et al., Handbook of Applied Cryptography, CRC Press, Oct. 1996. ISBN 0-8493-8523-7 (hardcover).

(Continued)

*Primary Examiner* — Edward Zee
*Assistant Examiner* — Thomas Gyorfi
(74) *Attorney, Agent, or Firm* — Finnegan, Henderson, Farabow, Garrett & Dunner LLP

(57) ABSTRACT

System and methods are disclosed for governing digital rights management systems and other applications through the use of supervisory governance applications and keying mechanisms. Governance is provided by enabling the supervisory applications to revoke access keys and/or to block certain file system calls, thus preventing governed applications from accessing protected electronic content.

12 Claims, 6 Drawing Sheets

U.S. PATENT DOCUMENTS

| | | | |
|---|---|---|---|
| 5,949,876 | A | 9/1999 | Ginter et al. |
| 5,982,891 | A | 11/1999 | Ginter et al. |
| 5,999,949 | A | 12/1999 | Crandall |
| 6,112,181 | A | 8/2000 | Shear et al. |
| 6,138,119 | A | 10/2000 | Hall et al. |
| 6,157,721 | A | 12/2000 | Shear et al. |
| 6,185,683 | B1 | 2/2001 | Ginter et al. |
| 6,226,618 | B1 | 5/2001 | Downs et al. |
| 6,237,786 | B1 | 5/2001 | Ginter et al. |
| 6,240,185 | B1 | 5/2001 | Van Wie et al. |
| 6,253,193 | B1 | 6/2001 | Ginter et al. |
| 6,292,569 | B1 | 9/2001 | Shear et al. |
| 6,363,488 | B1 | 3/2002 | Ginter et al. |
| 6,389,402 | B1 | 5/2002 | Ginter et al. |
| 6,427,140 | B1 | 7/2002 | Ginter et al. |
| 6,449,367 | B2 | 9/2002 | Van Wie et al. |
| 6,618,484 | B1 | 9/2003 | Van Wie et al. |
| 6,640,304 | B2 | 10/2003 | Ginter et al. |
| 6,658,568 | B1 | 12/2003 | Ginter et al. |
| 6,668,325 | B1 | 12/2003 | Collberg et al. |
| 6,785,815 | B1 | 8/2004 | Serret-Avila et al. |
| 6,832,316 | B1 | 12/2004 | Sibert |
| 6,920,567 | B1 | 7/2005 | Doherty et al. |
| 6,973,444 | B1 | 12/2005 | Blinn et al. |
| 7,107,448 | B1 * | 9/2006 | MacKay et al. ............ 713/171 |
| 2001/0042043 | A1 | 11/2001 | Shear et al. |
| 2002/0023214 | A1 | 2/2002 | Shear et al. |
| 2002/0048369 | A1 | 4/2002 | Ginter et al. |
| 2002/0087859 | A1 | 7/2002 | Weeks et al. |
| 2002/0112171 | A1 | 8/2002 | Ginter et al. |
| 2002/0152173 | A1 | 10/2002 | Rudd |
| 2003/0023856 | A1 | 1/2003 | Horne et al. |
| 2003/0041239 | A1 | 2/2003 | Shear et al. |
| 2003/0046244 | A1 | 3/2003 | Shear et al. |
| 2003/0069748 | A1 | 4/2003 | Shear et al. |
| 2003/0069749 | A1 | 4/2003 | Shear et al. |
| 2003/0084003 | A1 | 5/2003 | Pinkas et al. |
| 2003/0105721 | A1 | 6/2003 | Ginter et al. |
| 2003/0163431 | A1 | 8/2003 | Ginter et al. |
| 2004/0054630 | A1 | 3/2004 | Ginter et al. |
| 2004/0059951 | A1 | 3/2004 | Pinkas et al. |
| 2004/0073813 | A1 | 4/2004 | Pinkas et al. |
| 2004/0103305 | A1 | 5/2004 | Ginter et al. |
| 2004/0107356 | A1 | 6/2004 | Shamoon et al. |
| 2004/0123129 | A1 | 6/2004 | Ginter et al. |
| 2004/0133793 | A1 | 7/2004 | Ginter et al. |
| 2005/0027871 | A1 | 2/2005 | Bradley et al. |
| 2005/0050332 | A1 | 3/2005 | Serret-Avila et al. |
| 2005/0060560 | A1 | 3/2005 | Sibert |
| 2005/0060584 | A1 | 3/2005 | Ginter et al. |
| 2005/0108555 | A1 | 5/2005 | Sibert |

FOREIGN PATENT DOCUMENTS

| | | |
|---|---|---|
| WO | WO 97/43761 | 11/1997 |
| WO | WO 98/09209 | 3/1998 |
| WO | WO 98/10381 | 3/1998 |
| WO | WO 98/37481 | 8/1998 |
| WO | WO 99/01815 | 1/1999 |
| WO | WO 99/24928 | 5/1999 |
| WO | WO 99/48296 | 9/1999 |
| WO | WO 00/75925 | 12/2000 |
| WO | WO 01/06374 | 1/2001 |
| WO | WO 01/09702 | 2/2001 |
| WO | WO 01/10076 | 2/2001 |

OTHER PUBLICATIONS

Naor, Dalit, et al., "Revocation and Tracing Schemes for Stateless Receivers," http://citeseer.nj.nec.com/420701.html (Feb. 2001), 33 pages.

Schneier, B., Applied Cryptography, 2d ed., John Wiley & Sons, Oct. 1995. ISBN 0-4711-1709-9 (paperback).

Olin Sibert et al., "DigiBox: A Self-Protecting Container for Information Commerce," Proceedings of the First USENIX Workshop on Electronic Commerce, New York, NY, Jul. 1995, 9 pages.

Olin Sibert et al., "Securing the Content, Not the Wire, for Information Commerce," InterTrust Technologies Corporation, 1996, 12 pages.

Stefik, M., "Trusted Systems," Scientific American, Mar. 1997, pp. 78-81.

Stefik, M., "Letting Loose the Light: Igniting Commerce in Electronic Publication," Xerox PARC, Palo Alto, CA, 1994-1995, 35 pages.

Stefik, M., "Letting Loose the Light: Igniting Commerce in electronic Publication," Internet Dreams: Archetypes, Myths, and Metaphors. Massachusetts Institute of Technology, 1996, pp. 219-253.

Stefik, M., "Chapter 7, Classification, Introduction to Knowledge Systems," Morgan Kaufmann Publishers, Inc., 1995, pp. 543-607.

Office Action dated Nov. 15, 2004, issued in related U.S. Appl. No. 09/874,744, filed Jun. 4, 2001, MacKay et al.

Office Action dated Aug. 10, 2005, issued in related U.S. Appl. No. 09/874,744, filed Jun. 4, 2001, MacKay et al.

Office Action dated May 12, 2006, issued in related U.S. Appl. No. 09/874,744, filed Jun. 4, 2001, MacKay et al.

"Cryptolope* Container" © 1998 IBM Corp. http://web.archive.org/web/19980122001620/http://ww.cryptolope.ibm.com/white.htm.

Notice of Allowance issued Jul. 17, 2006, in U.S. Appl. No. 09/874,744, filed Jun. 4, 2001, MacKay et al.

Office Action dated Aug. 25, 2009, issued in U.S. Appl. No. 11/509,867, filed Aug. 25, 2006, Aug. 25, 2006.

Final Office Action dated Jun. 3, 2010 issued in U.S. Appl. No. 11/509,867, filed Aug. 25, 2006.

Petzoid, "Programming Windows®, Fifth Edition," © 1998 Microsoft Press, Excerpt from Chapter 21.

Advisory Action dated Aug. 10, 2010 issued in U.S. Appl. No. 11/509,867, filed Aug. 25, 2006.

Office Action dated Mar. 14, 2011 issued in U.S. Appl. No. 11/509,867, filed Aug. 25, 2006.

* cited by examiner

SYSTEMS AND METHODS FOR GOVERNING CONTENT RENDERING, PROTECTION, AND MANAGEMENT APPLICATIONS

RELATED APPLICATIONS

This application is a continuation of U.S. patent application Ser. No. 11/509,867, filed Aug. 25, 2006, now abandoned, which is a continuation of U.S. patent application Ser. No. 09/874,744, filed on Jun. 4, 2001, now U.S. Pat. No. 7,107,448 B1, and claims the benefit of priority from U.S. Provisional Patent Application No. 60/209,454, entitled "Systems and Methods for Governing Content Rendering, Protection, and Management Applications," filed Jun. 4, 2000, all of which are incorporated herein by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the management of electronic content. More specifically, systems and methods are disclosed for governing and managing content-rendering applications and content protection and management mechanisms.

BACKGROUND OF THE INVENTION

Advances in electronic communications, storage, and processing technology have led to an increasing demand for digital content. Today, large quantities of information can be readily encoded and stored on compact and easily-transportable media, and can be conveniently accessed using high-speed connections to networks such as the Internet, or via wireless communication networks such as W-LAN, W-WAN, and cellular.

However, despite the demand for digital content, and the availability of technology that enables its efficient creation and distribution, the threat of piracy has kept the market for digital goods from reaching its full potential, for while one of the great advantages of digital technology is that it enables information to be perfectly reproduced at little cost, this is also a great threat to the rights and interests of artists, content producers, businesses, and other copyright holders who often expend substantial amounts of time and money to create original works. As a result, content owners are often reluctant to distribute their works in electronic form—or are forced to distribute their works at inflated (or deflated) prices to account for piracy—thus limiting the efficiency and proliferation of the market for digital goods, both in terms of the selection of material that is available and the means by which that material is distributed.

While increasing attention has been paid to the development of digital rights management (DRM) mechanisms to address the problems described above, the large number of competing—and typically incompatible—rights management systems have created interoperability and security problems of their own. As a result, content owners are often reluctant to entrust their content to any of the array of content management mechanisms and content-rendering applications that presently exist in the marketplace.

SUMMARY OF THE INVENTION

The present invention provides systems and methods for enabling content owners, industry organizations, and other interested parties to supervise or govern the application programs, devices, and rights management systems that are used to render, protect, or otherwise access or use electronic content. It should be appreciated that the present invention can be implemented in numerous ways, including as a process, an apparatus, a system, a device, a method, a computer readable medium, or a combination thereof. Several inventive embodiments are described below.

In one embodiment a supervisory management system is disclosed. A secure processing application acts as the supervisor of a second application. The secure processing application is used to access protected digital information that is stored in a secure electronic container. The secure processing application extracts secret information—such as an access key or a portion of an access key—that is needed by the second application to access protected content. Revocation of the second application's authorization to process protected content can be accomplished by revoking access to the secure container through the secure processing application. In one embodiment, the second application is a digital rights management system that is operable to manage the use of content to which the supervisory management system has granted access. The content may consist of encrypted content and rules that govern the content's use. In this embodiment, the second application is operable to ensure that the content is used in accordance with the rules. If it is determined that the second application is not adequately enforcing the rules, the supervisory management system can revoke the second application's ability to access the content and/or the second application's ability to grant access to the content.

In another embodiment, a governance system is established by using a first application to act as a supervisory digital rights managements system that controls a second application. The second application is managed or controlled by linking with the first application. The first application filters or mediates the calls from the second application to certain native platform services. When the second application makes calls to its native platform prior to opening a file, the request is filtered through the first application, which applies rules and/or credential checks to regulate or manage the files to which the second application is granted access.

In yet another embodiment a method is disclosed for utilizing one digital rights management application to govern the operation of another digital rights management application. A control application receives a request to access electronic content from the governed application. The control application also receives a keyshare from the governed application. The control application requests another keyshare from the governing digital rights management application. If certain conditions are satisfied, the governing application supplies its keyshare to the control application. The control application uses the two keyshares to retrieve information that is needed by the governed application to access the requested content. The control application retrieves the protected content and provides it to the governed application (or provides the information needed by the governed application to access the protected content).

In another illustrative embodiment, a system for controlling access to electronic content is described. The system includes a first application program that is configured to request access to protected electronic content. The first application manages the electronic content in accordance with rules that are associated therewith. In addition, a second application program is provided for releasing the protected electronic content to the first application program in response to the first application's request. The second application is capable of receiving information from a third party or external source that indicates whether or not the second application should grant access to the protected electronic content to the first application.

In another embodiment, a method is described for controlling an application's access to electronic content. When the application attempts to retrieve electronic content by invoking standard file system calls, these calls are routed to a special conformance library which invokes a governance engine. The governance engine is designed to perform integrity checks on the application program to detect improper modifications. If the application program has been improperly modified, the governance engine will deny access to the content by blocking the file system calls. Furthermore, the conformance library will also determine if the application program has received affirmative authorization to access electronic content. If no authorization is detected, then the application program will be denied access to the electronic content. Otherwise, the application is allowed to access the electronic content.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of the invention is provided below. While the invention is described in conjunction with several embodiments, it should be understood that the invention is not limited to any one embodiment. Instead, the scope of the invention is defined only by the appended claims, and encompasses numerous alternatives, modifications, and equivalents. While numerous specific details are set forth in the following description in order to provide a thorough understanding of the present invention, the present invention may be practiced without some or all of these details. Moreover, for the purpose of clarity, certain technical material that is known in the art related to the invention has not been described in detail in order to avoid unnecessarily obscuring the present invention. For example, reference will be made to a number of terms and concepts that are well-known in the field of cryptography. Background information on cryptography can be found, for example, in Menezes et al., *Handbook of Applied Cryptography* (CRC Press 1996) ("Menezes"), and Schneier, *Applied Cryptography*, 2d ed. (John Wiley & Sons 1995).

Governance via a Secure Processing Application

In one embodiment a secure processing application (e.g., a supervisory digital rights management system) is provided to govern the operation of a second application. The second application may include other digital rights management systems or other applications. For example, the second application might comprise a music player, video streaming application, text reader, or the like. The supervisory DRM system has the ability to revoke the second application's ability to access information that the second application needs in order to grant access to content. The content may be deployed in a globally interoperable fashion or in a non-interoperable fashion.

Figure 1:
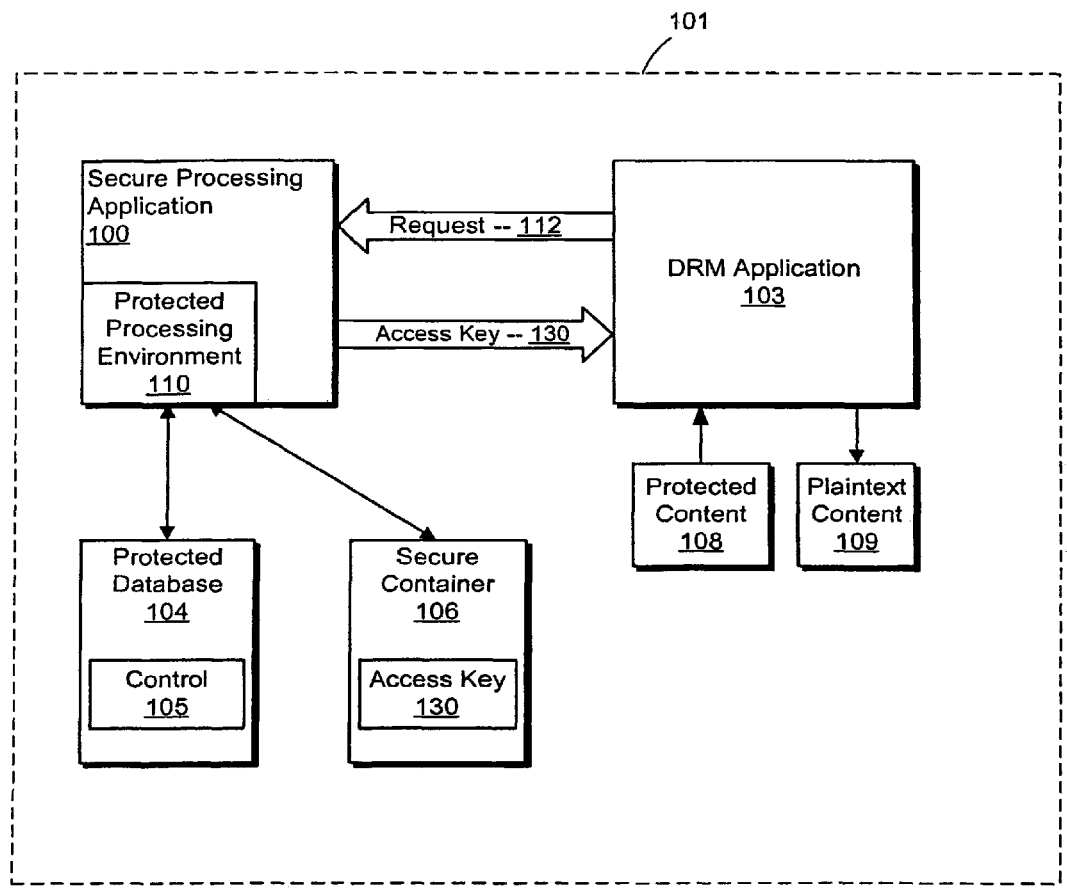
FIG. 1 illustrates a system for governing the operation of other digital rights management systems using a supervisory digital rights management system.

Referring to FIG. 1, a secure processing application 100 is installed on a PC client, computing device, and/or commerce service 101. As described in more detail below, the secure processing application 100 acts as the supervisor of a second application 103 which may also be installed on system 101. Alternatively, application 100 may be installed on a computer system that is remote from the system on which application 103 is installed.

As shown in FIG. 1, secure processing application 100 preferably includes (or is able to establish) a protected processing environment 110 and a protected database 104. The secure processing application 100 is preferably able to process protected data (e.g., cryptographic keys 130) and to enforce rules or controls (e.g., control 105) that are associated with the content.

In one embodiment, secure processing application 100 comprises an instance of the InterRights Point™ software or the Rights/System™ software produced by InterTrust Technologies Corporation of 4750 Patrick Henry Drive, Santa Clara, Calif., although one of ordinary skill in the art will recognize that other suitable secure processing applications and/or digital rights management applications could be used instead. For example, without limitation, secure processing application 100 could comprise software and/or hardware that implements some or all of the virtual distribution environment functionality and features described in commonly-assigned U.S. Pat. No. 5,892,900, entitled "Systems and Methods for Secure Transaction Management and Electronic Rights Protection," issued Apr. 6, 1999 ("the '900 patent"), which is hereby incorporated by reference in its entirety. In one embodiment, secure processing application 100 is a relatively small footprint piece of software and/or hardware that is operable to perform the key management and revocation functionality set forth herein, but little if anything else. In a preferred embodiment, secure processing application 100 is constructed using security and tamper resistance techniques such as those described in the '900 patent to ensure that it functions in a relatively secure and reliable fashion.

As shown in FIG. 1, secure processing application 100 is used to access protected digital information 130 that is stored in a secure electronic container 106 and/or in protected database 104. The secure electronic container can take any suitable form. For example, secure electronic container 106 might comprise a DigiBox® or DigiFile™ container produced by InterTrust Technologies Corporation, or might simply consist of an encrypted version of the protected digital information. In other embodiments, other secure container formats—such as those described in the '900 patent or available commercially—could be used. Similarly, protected database 104 may also be implemented in any suitable manner, including without limitation as described in the '900 patent and/or commonly-assigned U.S. patent application Ser. No.

09/617,148, entitled "Trusted Storage Systems and Methods", filed Jul. 17, 2000, which is hereby incorporated by reference.

As shown in FIG. 1, in response to a request 112 from application 103 to access content 108, secure processing application 100 extracts secret information—such as access key 130—from secure container 106 (e.g., by decrypting the relevant portion of secure container 106) and/or protected database 104, and forwards this information (or information derived from, controlled by, or otherwise related to this information) to application 103. This secret information is needed by application 103 to access protected content 108 and to render or make available plaintext content 109. Alternatively, secure processing application 100 may itself decrypt protected content 108, thus obviating the need to forward application 103 the information 130 needed to access the content. In either case, revocation of application 103's authorization to process protected content 108 can be effectuated simply by revoking application 103's access to, or use of, the secret information 130 controlled by secure processing application 100. For example, a control 105 could be delivered to secure application 100 that indicates that application 103 is not to be granted access (or certain types of access) to the secret information contained in secure container 106 or in protected database 104. Similarly, another control could be delivered to indicate that access to the secret information should be restored. Additional information on exemplary implementations of controls such as these can be found in the '900 patent, which was previously incorporated by reference.

In some embodiments, the operation and security of some portion of application 103 may be tested (e.g., before deployment) to ensure compliance with operational and security requirements of the content owner and/or system administrator. For example, the content owner or system administrator can establish the necessary criteria or minimal requirements that application 103 must satisfy in order to render or process protected content 108. If it is subsequently discovered that application 103 is no longer meeting these requirements, then application 103's ability to access and/or manage content can be revoked, e.g., in the manner described above.

Figure 2:
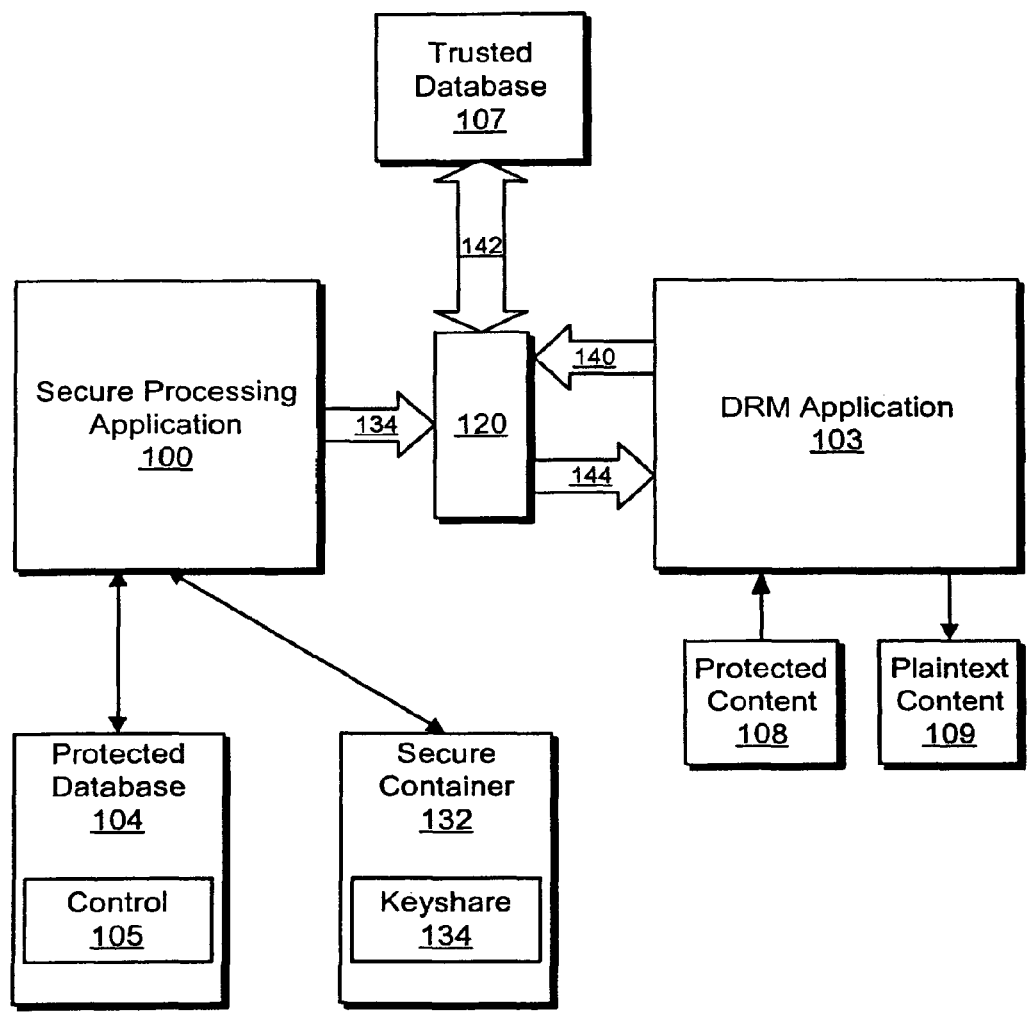
FIG. 2 illustrates the use of a secure processing application to manage a second digital rights management application.

FIG. 2 illustrates an embodiment of a system related to the one shown in FIG. 1. As in FIG. 1, application 103 may comprise a DRM system or content rendering application that seeks to manage or render protected content 108. As shown in FIG. 2, a control application 120 is communicatively coupled to both application 100 and application 103. Control application 120 may, for example, be created or supplied by a trusted third party (e.g., a party other than the providers of application 100 and application 103), or may be provided by the provider of secure processing application 100. Control application 120 controls access to database 107, which may be provided by the same party that provided the control application 120, or by a different party, and may, like control application 120, be located on the same system as application 100 and/or application 103, or on a different system.

As shown in FIG. 2, application 103 provides keyshare and/or other identification information 140 to control application 120. This information 140 is used by application 120 to obtain access to information stored in a database 107. A keyshare may, for example, simply comprise a portion of a decryption key. Control application 120 is also supplied with a keyshare 134 (or an entire key) by secure processing application 100. As shown in FIG. 2, application 100 may have retrieved keyshare (or key) 134 from a secure container 132 and may have used a control 105 stored in its protected database 104 to decide whether to supply keyshare 134 to control application 120. The use of controls to govern the use of content is described in more detail in the '900 patent, which was previously incorporated herein by reference. Control application 120 uses keyshares 134 and 140—and possibly other keyshares maintained by control application 120 or obtained from other sources—to retrieve information 142 (such as a decryption key) needed to provide access to content 108. Control application 120 supplies this information to DRM application 103, which uses it to access protected content 108. Having obtained access to content 108, DRM application 103 governs it in accordance with any rules with which it is associated, and, if appropriate, may provide plaintext content 109 to a user or rendering application. In some embodiments, control application 120 may be operable to decrypt protected content 108 itself, thus avoiding the need to send the information needed to decrypt (or otherwise gain access to) protected content 108 to application 100 or application 103.

The systems described above allow different DRM systems and applications to operate fairly independently (with respect to other key management techniques that may be available for protecting content), while also leveraging the hardware and/or software security features of the secure processing application 100. As noted above, the access key can be split between the secure processing application 100 and the DRM application 103, so that if application 103 has superior software and/or hardware security capabilities to that of application 100, the protection offered by DRM application 103 would not be compromised if the security of application 100 was compromised. As discussed above, shares of keys could be split among applications, portable devices, local content management modules, and secure containers. For example, secure container 132 could hold a share of a key necessary for the application 103 to establish a secure channel with a portable device, a share of a key used in the IEEE 1394 protocol, and so forth.

In addition, in some embodiments control application 120 can effectively serve as a mediator between two or more digital rights management systems (e.g., application 100 and 103), giving any digital rights management system the ability to supervise or control the operation of the others. Referring to FIG. 2, for example, certain content owners or distributors may want the ability to revoke access to content 108 using either digital rights management system 100 or 103, thus obtaining some level of redundant protection in case either one of the rights management systems is cracked. This could be accomplished using the arrangement shown in FIG. 2, where either one of the rights management system's ability to access protected content 108 and/or the information contained in trusted database 107 could be controlled by sending appropriate commands or controls to the other rights management system. Thus, as shown in FIG. 2, protected content 108 could be packaged in the encoding format used by DRM application 103, thus giving DRM system 103 the ability to manage the distribution and use of the content; however, this encoded content would itself be protected (e.g., further encrypted) such that DRM application 100 would be able to supervise the operation of application 103 and revoke access to content 108 if desired. Similarly, other pieces of content could be packaged in the encoding format used by DRM application 100, thus giving DRM application 100 the ability to manage the distribution and use of the content; however, this encoded content could itself be protected such that DRM application 103 would be able to supervise the operation of application 100, and revoke access to the content if desired. Moreover, if either DRM system was compromised, the content owner could, if desired, prevent further access to the content simply by sending an appropriate control to the DRM system that had not been compromised.

In some embodiments, key distribution and revocation schemes such as those described in Naor et al. and the CPRM standard can be used to provide control over local DRM systems or devices. See Naor et al., "Revocation and Tracing Schemes for Stateless Receivers," available at http://citeseer.nj.nec.com/420701.html (February 2001). In such embodiments, sets of keys (or keyshares) are distributed to local DRM systems or devices (or classes of local DRM systems or devices), and, as described above, those keys are used to access information needed by the local DRM system or device to access content or to perform certain functions. These keys can be revoked and/or updated using the mechanisms described in Naor et al. and the CPRM standard, thus providing a way to control/supervise the operation of the local DRM system or device. For example, if a finite geometry key distribution mechanism is used, and each device or application is given a series (or distinguished subset) of keys, revocation can be accomplished by removing a series of keys from the key geometry.

An advantage of such an implementation is that a local DRM system (such as application 103 in FIGS. 1 and 2) can be controlled without the necessity of also installing a secure processing application such as application 100 on the local system, and/or without having to interactively communicate with such an application 100 after application 103 has been deployed. A disadvantage of such a technique is that it can be relatively difficult to implement an efficient revocation mechanism, especially one that enables revocation of previously-packaged content.

Governance via a Conformance Library and Credentials

In another embodiment, an application running on a host computer system is governed by linking it to (or incorporating it with) a special conformance library. The conformance library filters or mediates certain requests from the governed application to the host computer system's native platform services (e.g., file input/output and the like). The conformance library invokes a supervisory application that determines whether the governed application has been improperly modified and whether it is authorized to perform the requested action. If the supervisory application determines that the governed application has not been improperly modified and is authorized to perform the requested action, then the governed application's request is forwarded to the appropriate host system service, which fulfills the request just as it would had the supervisory application not first intercepted it. Several illustrative embodiments of the foregoing process are described below in connection with FIGS. 3A, 3B, and 3C.

Figure 3A:
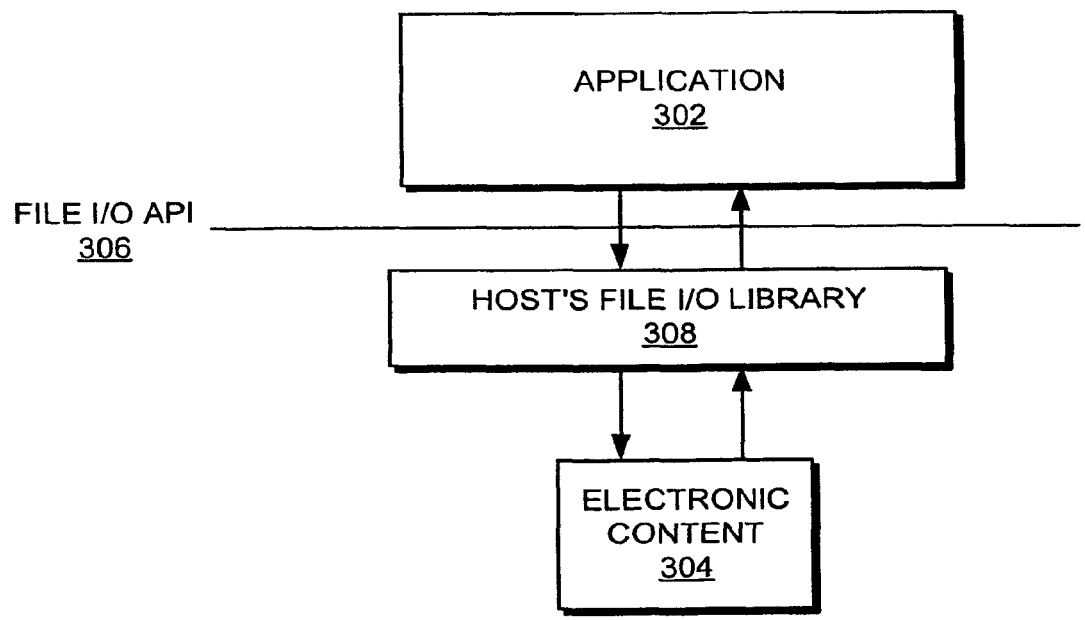
FIG. 3A illustrates a conventional mechanism for accessing electronic content.

FIG. 3A illustrates the conventional manner by which an application 302 accesses electronic content 304 on a host computer system. Application 302 may, for example, comprise a digital rights management application, content viewer, or any other type of application that assists or contributes to the use, rendering, distribution, or management of digital information. As shown in FIG. 3A, when application 302 wishes to access content 304, it typically makes a call, via an application programming interface (API) 306, to a library of functions and procedures provided by the host system for performing the detailed, low-level operations involved in retrieving the electronic content from the host system's storage and providing it to the requesting application.

Figure 3B:
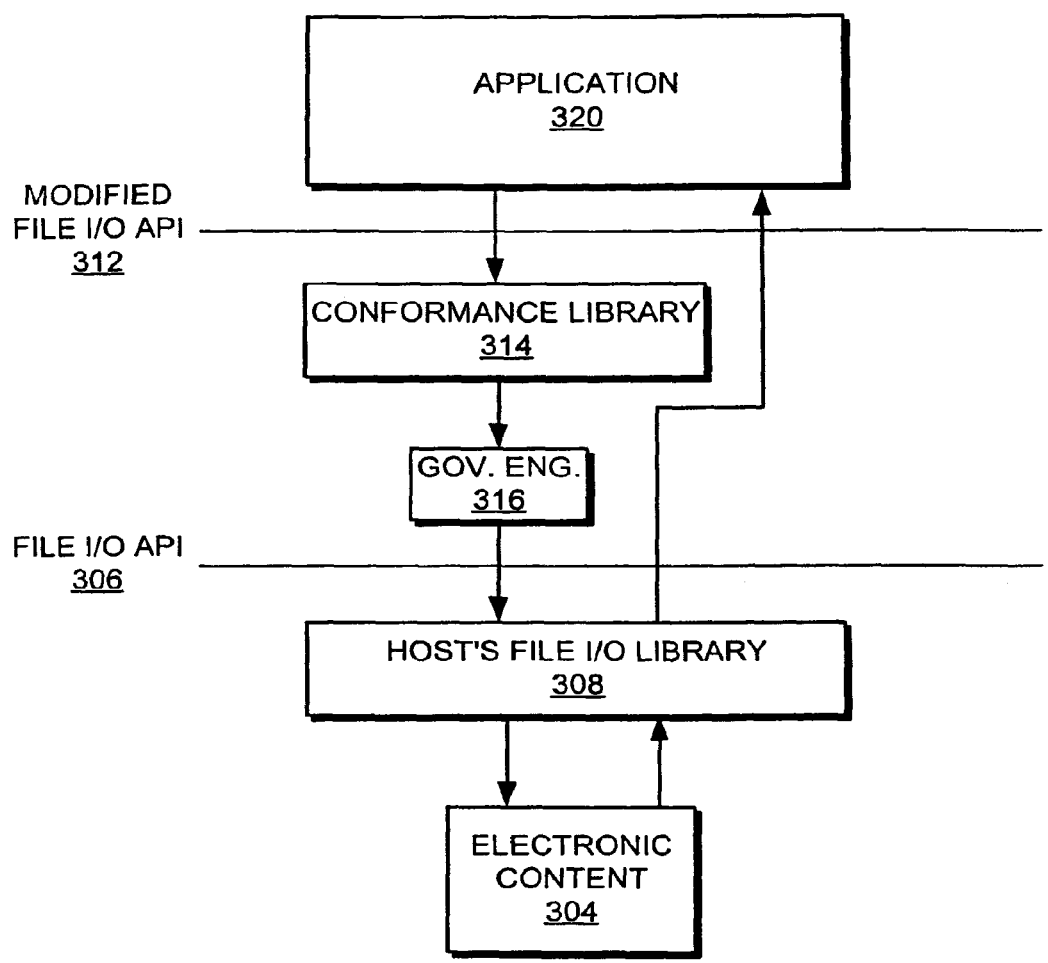
FIG. 3B illustrates a system for governing a content rendering and/or management application in accordance with an embodiment of the present invention.

FIG. 3B shows how the conventional system of FIG. 3A can be modified to provide governance over the operation of an application 320. As shown in FIG. 3B, when application 320 wishes to access a piece of electronic content 304, it makes a call to a modified version of the host system's file input/output API 312. Calls to the modified API are handled by conformance library 314, which is operable to route these calls to a governance engine (also referred to as a supervisory application) 316 which determines whether the application's access request should be granted or denied. If supervisory application 316 determines that the request should be granted, it routes the request to the host system's file I/O library 308 via the host system's API 306. The host system then performs the necessary operations to retrieve the electronic content 304 for application 320.

It will be appreciated that an application 302 that was initially designed to operate in the manner shown in FIG. 3A need not undergo substantial modification to operate in the manner shown in FIG. 3B. For example, application 302 can simply be modified to indicate that calls to the host system's file I/O library 308 should be handled, instead, by conformance library 314. This would typically involve a few relatively minor changes to the application's header files, and not to the body of the application (e.g., the actual form of the calls would remain unchanged, the only change being to the identification of the library that handles those calls). Thus, in such an embodiment, modified file I/O API 312 would be virtually identical in form to the host system's file I/O API 306. Alternatively, each occurrence in the application of certain file I/O calls could be modified to refer directly to a corresponding function in the conformance library 314, although these modified calls would preferably be similar in form to the original file I/O calls (i.e., the modified file I/O API 312 would preferably be similar to the host system's API 306). Thus, in a preferred embodiment the application developer can integrate the supervisory application with the governed application quite easily, with little or no modification to the governed application, thus limiting the likelihood that bugs will be introduced into the application, or that call-paths through the governed application will be missed and governance compromised. In addition, the conformance library will typically be easy to test since it is preferably API-compatible with the standard platform interfaces. Application 320 need not be integrated in any other capacity with the system of governance engine 316.

Figure 3C:
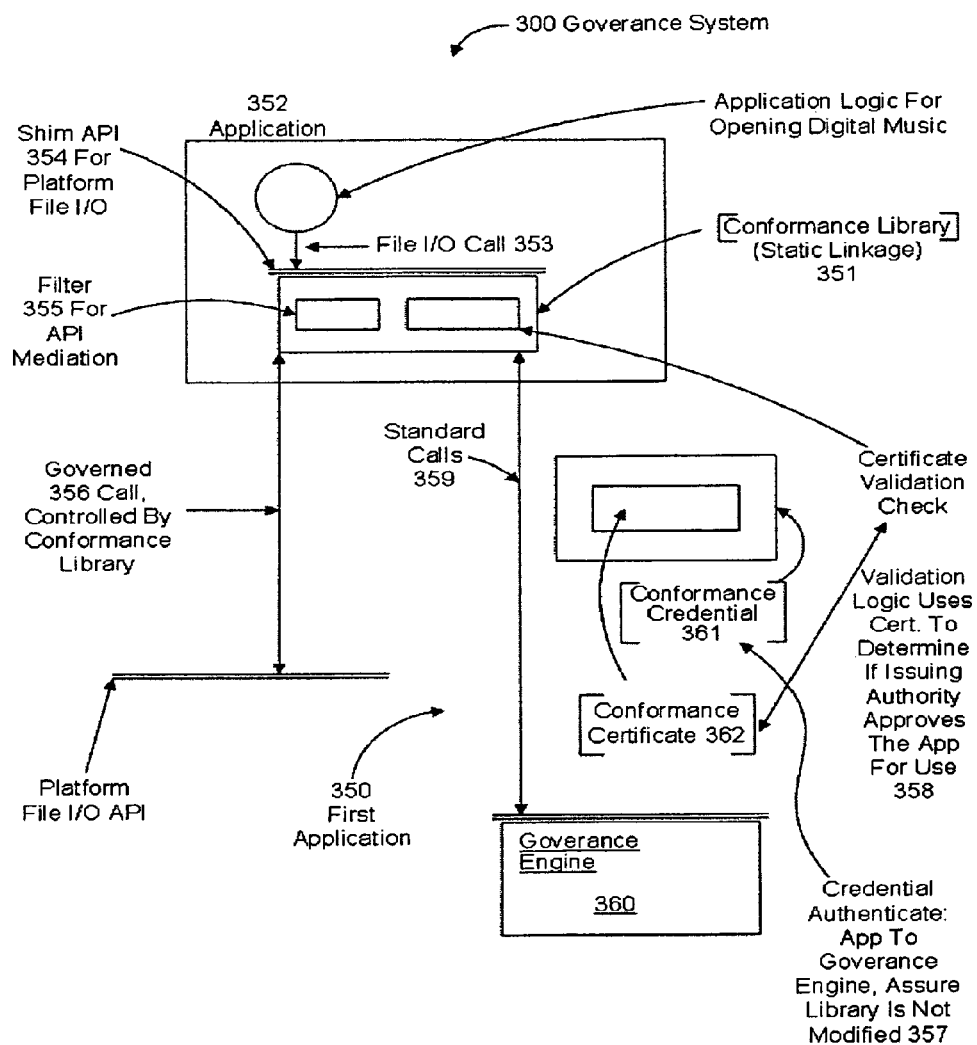
FIG. 3C illustrates a system for governing a content rendering and/or management application in accordance with another embodiment of the present invention.

FIG. 3C illustrates another embodiment of a system for governing an application in accordance with the present invention. Referring to FIG. 3C, a governance application 360 is linked via a conformance library 351 to a governed application 352. The conformance library 351 implements interfaces that that the governed application 352 must call, thereby governing the file I/O calls (e.g., file system calls, the ability to load other code dynamically, other system calls such as Kernel32 or Win32 API calls, and the like) from the governed application 352. The conformance library 351 effectively looks like a replacement set of file system I/O calls, and possibly a small set of additional calls (for example, GetProcAddress and LoadLibrary on Windows).

A mediator/shim 354 re-implements the actual file I/O calls through a filter 355 where the governed calls are controlled by the conformance library 351. The governance system effectively enforces the requirement that the file I/O call go through the conformance library 351 first. The mediator/shim 354 of the conformance library 351 may incorporate additional logic which, e.g., (a) allows it to verify or validate that a legitimate authorization certificate/conformance certificate has been given by the content owner, and (b) to force a credential check on the application 352 to ensure that it and/or the conformance library 351 have not been modified.

In a preferred embodiment, the conformance library 351 makes calls to governance engine 360. Governance engine 360 may, for example, be in the form of a commercial digital rights managements application, such as InterTrust's InterRights Point software or Rights/System software. Governance engine 360 may be installed on the same computer system as application 352, or may reside elsewhere, such as on a remote server.

The governance engine 360 checks the credential(s) 361 associated with the application 352 and/or the conformance library 351. For example, if the credential 361 comprises a digitally-signed cryptographic hash or checksum, the governance engine 360 preferably verifies the authenticity of the digital signature, then computes the corresponding hash or checksum on the appropriate portions of the governed application 352 and/or conformance library 351 to determine whether the governed application and/or library have been modified. If a strong, one-way hashing algorithm such as SHA-1 is used to generate a hash of the application and/or conformance library (or selected portions thereof), then it will be computationally infeasible to modify the hashed portions without detection by the governance engine (i.e., the hash computed by the governance engine of the modified application will not be the same as the hash contained in the credential).

If the governance engine 360 determines that the application has not been modified, then the governance engine 360 checks the certificate 362 associated with the application to determine whether the application is authorized to perform the action that it is seeking to perform. In one embodiment, the application's certificate 362 forms part of credential 361. In other embodiments, the certificate may be maintained independently by governance engine 360, the association between the certificate and application 352 being accomplished via credential 361 (e.g., the cryptographic hash or checksum of the application serving to identify the application to the governance engine as the possessor of the authorizations specified in the certificate (which might also contain the hash or checksum)).

The certificate 362 serves as a cross-reference to ensure that the application 352 is authorized by the content owner as a certified or compliant application in conformance with desired characteristics. It is intended that the content owner will be provided with, or have access to, sufficient tools for generating "authorization certificates" for applications 352 that implement the conformance library 351. The content owner may be responsible for establishing the appropriate criteria for the issuance of the certificates (and for checking for compliance therewith). In this regard, it will be appreciated that any suitable technique can be used to generate and utilize the conformance credentials and certificates, including without limitation the credentialing techniques described in the '900 patent, Menezes at pages 321-481, U.S. Pat. No. 6,157,721, entitled "Systems and Methods Using Cryptography to Protect Secure Computing Environments," issued Dec. 5, 2000 ("the '721 patent"), U.S. patent application Ser. No. 09/628,692, entitled "Systems and Methods for Using Cryptography to Protect Secure and Insecure Computing Environments," filed Jul. 28, 2000, U.S. patent application Ser. No. 60/210,479, entitled "Rights Management Systems and Methods," filed Jun. 9, 2000, U.S. patent application Ser. No. 09/863,199, entitled "Trust Management Systems and Methods," filed May 21, 2001, each of which is hereby incorporated by reference in its entirety, and U.S. patent application Ser. No. 09/879,743, entitled "Rights Management Systems and Methods," filed Jun. 11, 2001, which claims benefit to Provisional Application No. 60/210,479, filed Jun. 9, 2000.

In one embodiment, after the application vendor has implemented the library 351 and received a certificate 362, it presents the application and certificate to the third-party governance service identified by the content owner. The third-party governance service generates a credential 361 which wraps the certificate so that it cannot be tampered with (e.g., using a one-way cryptographic hash); the credential is strongly authenticated and bound to the application. The vendor receives everything back along with the credential. The application vendor distributes its product in the normal manner. In this embodiment, updates to the application may require re-credentialing. Applications that use the library need not ship the governance engine, but once enabled with the library, will only be able execute content-owner-controlled functions in the presence of the governance engine.

Figure 4:
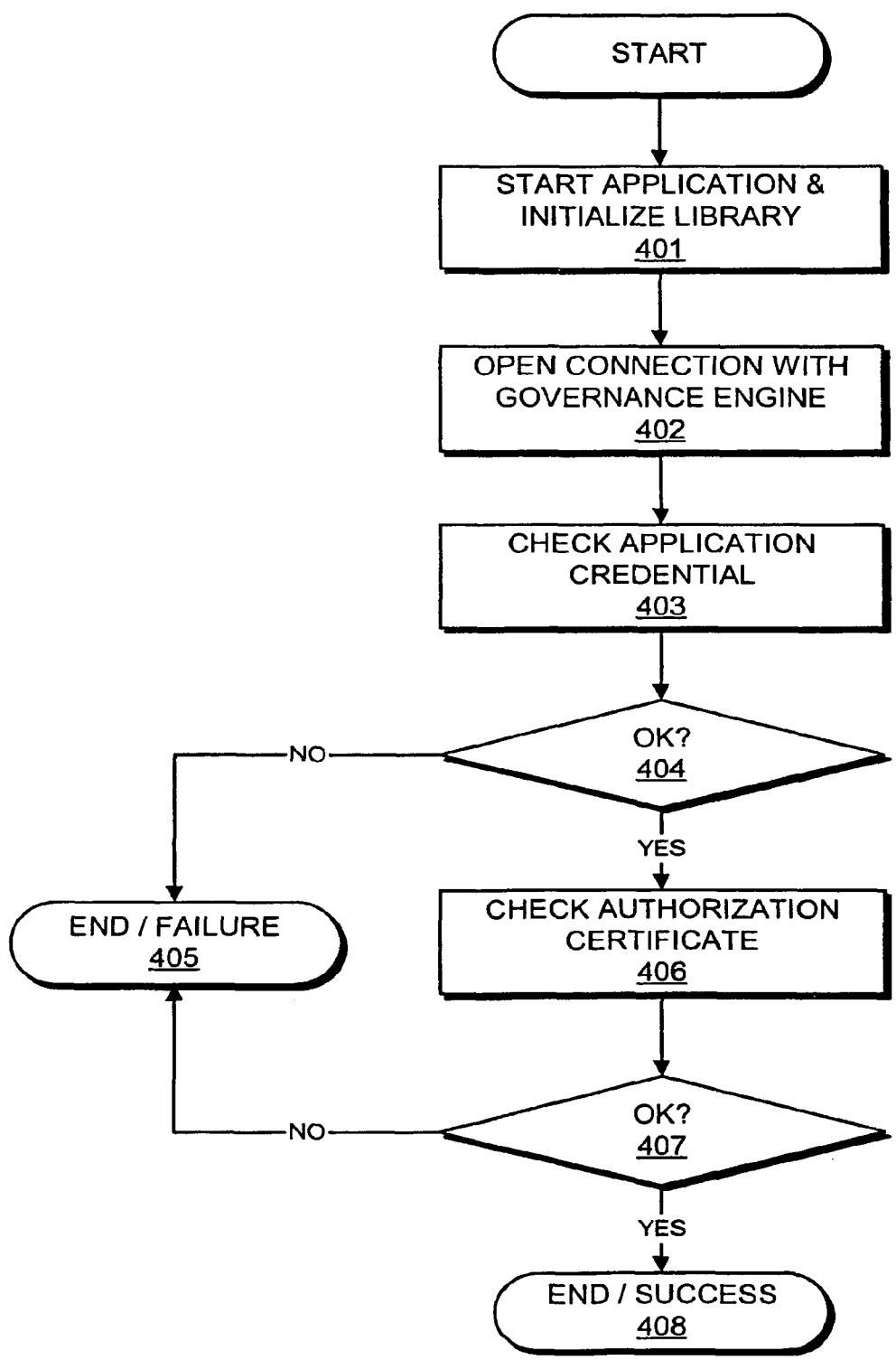
FIG. 4 illustrates a method for governing content rendering applications and digital rights management systems.

FIG. 4 illustrates a method for governing content rendering applications and digital rights management systems using the system shown in FIG. 3C. As shown in FIGS. 3C and 4, when a content rendering application or digital rights management system 352 starts, it makes a call to initialize a conformance library 351 (401). Conformance library 351 opens a connection with a governance engine 360 (402) and forces a credential check (403). If credential 361 is bad (i.e., a "No" exit from block 404), the conformance library returns an initialization failure (405) that disables the application and returns a system error. Alternatively, other failure modes could be used, including, for example, continuing operation but providing the user with a means of obtaining a new credential.

Referring back to FIG. 4, if credential 361 is good (i.e., a "Yes" exit from block 404), application 352 checks certificate 362 to determine whether the application is authorized by the content owner to access content (406). If authorization is detected (i.e., a "Yes" exit from block 407), the conformance library 351 will pass subsequent API calls through to the host system's file I/O API, and the application 352 will run normally (408). If authorization is not detected (i.e., a "No" exit from block 407), the application's calls will not be passed through to the file system, and the application will thus be unable to perform the governed operations.

It will be appreciated that a number of variations can be made to the process shown in FIG. 4 without departing from the principles of the present invention. For example, while FIG. 4 shows a process for determining once, when an application is initiated, whether the application is authentic and is authorized to perform certain actions, it should be appreciated that alternatively, or in addition, the application's integrity and/or authorization could be checked by the supervisory application each time the application seeks to perform one of the governed operations, or at predefined intervals.

In a preferred embodiment, the conformance library 351 requires governance to be affected by an enforceable set of interactions with the governance engine 360 using the application credentialing mechanism. However, unless the provider of the governance engine 360 certifies the application 352, the credential 361 imposes no other control over the operation of the application 352 (and the application developer need not learn anything more about the governance engine provider's system). An application that incorporates this mechanism may pick up some additional runtime characteristics, such as runtime anti-debugging, tamper resistance, and/or the like.

In one embodiment, the actual determination of whether a governed application has the right to render or use digital information is made by functions implemented by the conformance library that validate the content owner's certificate. However, the governance interaction of establishing a valid session with the governance engine and checking the credential is first performed in order to determine whether the conformance library should be allowed to access the certificate at all. If the credential is valid, the conformance library is allowed to retrieve the certificate, and if the certificate is valid, the conformance library allows the governed calls (e.g., file I/O calls) to proceed in the normal manner. The conformance library 351 thus implements logic that: (a) checks for a credential issued by the content owner or some other entity, and (b) implements non-subvertible linkage and calls to the underlying governance engine. Thus, in this embodiment, the provider of the governance engine effectively enables the management of the governed application, but the policies and rules that affect whether or not the application can actually render content or perform other controlled operations are established by authentication of the content owner's certificate. Thus, content owners can establish a third-party governance engine that enables strong enforcement of the content owners' policies without imposing additional policies of the third-party provider of the governance engine. Revocation can also be handled by using expiring credentials and/or certificates, and forcing updates on a predefined, periodic basis—for example, quarterly, yearly, daily, or on a different time period or basis.

As indicated previously, in other embodiments the application's certificate (or additional certificates associated therewith) may be maintained and enforced by the governance engine itself, rather than the conformance library. This allows the content owner (and/or the provider of the governance engine) to dynamically revoke the certificates simply by sending appropriate commands to the governance engine (e.g., sending a new certificate or control that revokes the original certificate).

Although the foregoing invention has been described in some detail for purposes of clarity, it will be apparent that certain changes and modifications may be practiced within the scope of the appended claims. It should be noted that there are many alternative ways of implementing both the processes and apparatuses of the present invention. Accordingly, the present embodiments are to be considered as illustrative and not restrictive, and the invention is not to be limited to the details given herein, but may be modified within the scope and equivalents of the appended claims.

What is claimed is:

1. A non-transitory computer-readable storage medium storing instructions that, when executed by a processor on a first computer system, are configured to cause the first computer system to perform a method for controlling the operation of a first digital rights management system on the first computer system, the method comprising:
   receiving, at a control application located on the first computer system, a request from the first digital rights management system to access a piece of electronic content;
   receiving, at the control application, a first keyshare from the first digital rights management system;
   receiving, at the control application, a second keyshare from a second digital rights management system located on the first computer system, the second digital rights management system being operable to send the second keyshare only if one or more conditions are satisfied;
   using the first keyshare and the second keyshare to enable the control application to retrieve a piece of content-access information from protected storage on the first computer system; and
   using the piece of content-access information to enable the first digital rights management system to access the piece of electronic content.

2. The non-transitory computer-readable storage medium of claim 1, in which the first keyshare and the second keyshare comprise portions of a first cryptographic key, the first cryptographic key being used to decrypt the piece of content-access information, the piece of content-access information comprising a second cryptographic key.

3. The non-transitory computer-readable storage medium of claim 2, in which the second cryptographic key is used by the second digital rights management system to decrypt the piece of electronic content.

4. The non-transitory computer-readable storage medium of claim 2, in which the second cryptographic key is sent to the first digital rights management system, the first digital rights management system being operable to use the second cryptographic key to decrypt the piece of electronic content.

5. The non-transitory computer-readable storage medium of claim 4, in which the decrypted piece of the electronic content comprises content protected in accordance with the encoding format of the first digital rights management system.

6. The non-transitory computer-readable storage medium of claim 1, further including instructions that, when executed by the processor, are configured to cause the first computer system to perform a method further comprising:
   determining that the first digital rights management system is not functioning properly; and
   sending control information to the second digital rights management system, the control information being operable to cause the second digital rights management system to deny access to the second keyshare when the first digital rights management system, or a process acting on its behalf, requests access to the second keyshare.

7. The non-transitory computer-readable storage medium of claim 1, further including instructions that, when executed by the processor, are configured to cause the first computer system to perform a method further comprising:
   receiving first control information at the second digital rights management system, the first control information causing at least one of said conditions to not be satisfied, thereby inhibiting the second digital rights management system from sending the second keyshare.

8. The non-transitory computer-readable storage medium of claim 7, further including instructions that, when executed by the processor, are configured to cause the first computer system to perform a method further comprising:
   receiving second control information at the second digital rights management system, the second control information causing said at least one condition to be satisfied, thereby enabling the second digital rights management system to send the second keyshare.

9. The non-transitory computer-readable storage medium of claim 1, in which the first keyshare is different from the second keyshare.

10. The non-transitory computer-readable storage medium of claim 1, further including instructions that, when executed by the processor, are configured to cause the first computer system to perform a method further comprising:
   the first digital rights management system receiving a request to access the piece of electronic content from a rendering application.

11. The non-transitory computer-readable storage medium of claim 1, in which the one or more conditions include a condition that the first digital rights management comply with a set of security requirements.

12. The non-transitory computer-readable storage medium of claim 1, in which the one or more conditions include a condition that the first digital rights management system is not known to have been compromised.

* * * * *